(12) United States Patent
Krämer et al.

(10) Patent No.: US 8,219,986 B2
(45) Date of Patent: Jul. 10, 2012

(54) INTERCHANGEABLE DRIVE ELEMENT FOR BOTTLE OR CONTAINER SUPPORTS IN A CONTAINER LABELING MACHINE OR A MACHINE CONFIGURED TO PRINT INFORMATION ON BOTTLES OR CONTAINERS, WHICH INTERCHANGEABLE DRIVE ELEMENT IS CAPABLE OF BEING USED IN DIFFERENT CONTAINER LABELING OR CONTAINER INFORMATION PRINTING MACHINES IN BOTTLE OR CONTAINER FILLING PLANTS

(75) Inventors: Klaus Krämer, Dortmund (DE); Winfried Schlüter, Horstmar (DE)

(73) Assignee: KHS GmbH, Dortmund (DE)

( * ) Notice: Subject to any disclaimer, the term of this patent is extended or adjusted under 35 U.S.C. 154(b) by 405 days.

(21) Appl. No.: 12/341,175

(22) Filed: Dec. 22, 2008

(65) Prior Publication Data

US 2009/0171489 A1 Jul. 2, 2009

Related U.S. Application Data

(63) Continuation-in-part of application No. PCT/EP2007/005401, filed on Jun. 20, 2007.

(30) Foreign Application Priority Data

Jun. 23, 2006 (DE) .......................... 10 2006 028 797

(51) Int. Cl.
*G06F 9/445* (2006.01)
*G06F 9/44* (2006.01)
*G06F 19/00* (2006.01)

(52) U.S. Cl. .................. 717/178; 717/173; 700/117

(58) Field of Classification Search .................. 700/95, 700/117; 717/168–178

See application file for complete search history.

(56) References Cited

U.S. PATENT DOCUMENTS

| | | | | |
|---|---|---|---|---|
| 5,852,590 | A * | 12/1998 | de la Huerga | 368/10 |
| 6,615,404 | B1 * | 9/2003 | Garfunkel et al. | 717/173 |
| 6,625,664 | B2 | 9/2003 | Gehring et al. | |
| 6,758,338 | B2 * | 7/2004 | Lien | 206/534 |
| 6,778,917 | B1 * | 8/2004 | Jansen | 702/45 |
| 6,837,562 | B2 * | 1/2005 | Nunokawa | 347/14 |
| 7,035,856 | B1 * | 4/2006 | Morimoto | 705/7.12 |
| 7,223,427 | B2 * | 5/2007 | Knepler | 426/231 |
| 7,228,536 | B2 * | 6/2007 | Matsumoto | 717/168 |
| 7,506,576 | B1 * | 3/2009 | Lassota | 99/280 |

(Continued)

FOREIGN PATENT DOCUMENTS

DE 198 50 469 5/2000

(Continued)

OTHER PUBLICATIONS

International Search Report PCT/EP2007/005401 and English translation thereof.

(Continued)

*Primary Examiner* — Crystal J Barnes-Bullock
(74) *Attorney, Agent, or Firm* — Nils H. Ljungman & Associates

(57) ABSTRACT

An interchangeable drive element for bottle or container supports in a container labeling machine or a machine configured to print information on bottles or containers, which interchangeable drive element is capable of being used in different container labeling or container information printing machines in bottle or container filling plants.

20 Claims, 3 Drawing Sheets

U.S. PATENT DOCUMENTS

| | | |
|---|---|---|
| 7,860,724 B2 * | 12/2010 | Chudy et al. ............ 705/2 |
| 2004/0215370 A1 | 10/2004 | Asama et al. |
| 2005/0086663 A1 | 4/2005 | Fritsch et al. |
| 2006/0193463 A1 * | 8/2006 | Graf ............ 379/269 |

FOREIGN PATENT DOCUMENTS

| | | |
|---|---|---|
| DE | 100 34 907 | 1/2002 |
| DE | 203 14 410 | 9/2004 |
| DE | 103 42 591 | 4/2005 |
| DE | 103 53 052 | 6/2005 |
| DE | 103 58 270 | 8/2005 |
| DE | 10 2004 011 457 A1 | 10/2005 |
| EP | 1 001 322 | 5/2000 |
| EP | 1 174 345 | 1/2002 |
| JP | 2003099264 A * | 4/2003 |
| WO | WO 2005/047992 | 5/2005 |
| WO | WO 2006/000167 | 1/2006 |
| WO | WO 2007147567 A1 * | 12/2007 |

OTHER PUBLICATIONS

European Office Action 07 764 725.3.

* cited by examiner

INTERCHANGEABLE DRIVE ELEMENT FOR BOTTLE OR CONTAINER SUPPORTS IN A CONTAINER LABELING MACHINE OR A MACHINE CONFIGURED TO PRINT INFORMATION ON BOTTLES OR CONTAINERS, WHICH INTERCHANGEABLE DRIVE ELEMENT IS CAPABLE OF BEING USED IN DIFFERENT CONTAINER LABELING OR CONTAINER INFORMATION PRINTING MACHINES IN BOTTLE OR CONTAINER FILLING PLANTS

CONTINUING APPLICATION DATA

This application is a Continuation-In-Part application of International Patent Application No. PCT/EP2007/005401, filed on Jun. 20, 2007, which claims priority from Federal Republic of Germany Patent Application No. 10 2006 028 797.5, filed on Jun. 23, 2006. International Patent Application No. PCT/EP2007/005401 was pending as of the filing date of this application. The United States was an elected state in International Patent Application No. PCT/EP2007/005401.

BACKGROUND

1. Technical Field

The present application relates to an interchangeable drive element for bottle or container supports in a container labeling machine or a machine configured to print information on bottles or containers, which interchangeable drive element is capable of being used in different container labeling or container information printing machines in bottle or container filling plants.

2. Background Information

The present application relates to a drive system for use in devices or machines for the handling of bottles, cans, and similar containers. The devices or machines have a higher-level machine controller, and the drive system is designed to be replaceable and comprises at least one drive element, an electronic open-loop and/or closed-loop control and/or monitoring unit and a memory for the storage of a control program for the electronic open-loop and/or closed-loop and/or monitoring unit, as well as a process for the control of such drive systems.

Some devices or machines for the handling of bottles, cans, or similar containers use replaceable drive systems. Such machines have a horizontal rotor, around the circumference of which are arranged a plurality of disk-like container carriers that carry bottles, cans, etc. The containers are placed on the container carrier at a point on the circumference of the rotor and fixed to the carrier by a suitable means such that the containers rotate with the container carrier when the carrier rotates. During one rotation of the rotor, the containers are passed along a plurality of processing stations, which, depending on the configuration of the machine, apply labels to or overprint the containers, for example.

Often, bottling companies use bottling plants with a series of lines. In such a plant, one line might be used to fill twenty-ounce bottles with one liquid material. Another line might be used to fill twenty-ounce bottles with a different, second liquid material. A third line might be used to fill two-liter bottles with the first liquid material. Yet another line might be used to fill two-liter bottles with the different, second liquid material. Each of these lines possibly includes at least a filling machine, a closing machine, and a labeling machine and/or an information printing machine configured to print information on bottles or containers.

The labeling machine and/or information printing machine configured to print information on bottles or containers in a line that fills, closes, labels and/or prints on twenty-ounce bottles or containers labels and prints differently than the labeling machine and/or information printing machine configured to print information on bottles or containers in a line that fills, closes, labels and/or prints on two-liter bottles or containers. For example, a printing machine prints information on one place of a twenty-ounce bottle and prints on a different place of a two-liter bottle. Therefore, the configuration of a first labeling and/or printing machine in a first line, which labels and/or prints on twenty-ounce bottles, differs from the configuration of a second labeling and/or printing machine in a second line, which labels and/or prints on two-liter bottles.

An actuator is provided to rotate the container carriers and the containers located thereon. Also provided are sensors, including angle measurement sensors, for the precise for general alignment of the container with each processing station passed and an electronic controller, which essentially ensures or promotes the precise or general alignment and controlled rotation of the container at the processing stations. Some actuators, the electronic controllers, sensors and possibly additional components are configured as compact, modular units for use as drive systems that are non-permanently attached to the rotor.

The machine has a higher-level machine controller that controls the handling of the containers as they pass through the machine. Various connecting paths, such as a bus system or similar, can be provided for the transmission of control commands to the individual machine components.

The modular drive units have an electronic control unit that comprises the control programs required or desired for the function of the drive, such as for the evaluation of the sensor information and the precise or general assumption of a possible angular position by control action.

The modular design of the drive system enables a defective drive to be quickly replaced at the machine in the event of repairs. No complex and time-consuming installation and deinstallation work is required or desired, since the complete module can be replaced as a unit. Problematic, however, is the fact that the class of the machines described is very large and the design of the machines thus varies widely. The actuators must or should therefore satisfy a wide range of requirements depending on the type of machine; this is achieved in part by the use of different control programs for the drive systems of different machines. In the case of a replacement, the problem is then that one must or should essentially ensure or promote that the version of the program used in the drive system is suitable for the respective machine, which given the state of the art means that a plurality of drive systems must or should be kept in inventory to be able to react as described to faults with various types of machines.

OBJECT OR OBJECTS

The object of the present application is to provide a drive system of the type described that can be used with a plurality of different machines with no manual modification and thus avoid, restrict, or minimize the disadvantages described above.

SUMMARY

To achieve this object, the present application teaches a drive system for use in devices or machines for the handling of bottles, cans and similar containers, whereby the devices or machines have a higher-level machine controller. The drive system is designed to be replaceable and has at least one drive element, an electronic open-loop and/or closed-loop control and/or monitoring unit 14 and a memory 16 for the storage of a control program for the electronic open-loop and/or closed-loop and/or monitoring unit 14, wherein there are corresponding communication interfaces on the drive system and the machine controller and the memory is rewriteable and configured in such a way that the control program can be transferred from the machine controller to the memory via the communication interfaces.

The drive system has a configuration that can be used in a plurality of handling machines. The rewritable configuration of the memory and/or firmware of the controller enables the version appropriate for the respective machine to be transferred to the memories of the drive system. Unlike conventional systems, in which this must or should be performed using specially configured software or by replacing the memory, the current present application enables the transfer directly from the higher-level machine to the memory.

Following the completed configuration or replacement of the drive system in the machine, a connection between the memory element or the electronic open-loop and/or closed-loop control and/or monitoring unit of the drive system and the higher-level machine controller is established via the existing communication interface. This can then transfer exactly or essentially exactly or generally the right control programs for this machine to the memory.

It is thus no longer necessary or desired to maintain inventory of specific, non-interchangeable drive systems for each type of machine, but instead there is a standard drive system that is provided with the required or desired control program following installation in a machine and is thus rendered fully functional for use in this machine.

The control program can be stored either in the machine controller itself or in external memory accessible by the machine controller. Known controllers frequently have integrated, flexible-use memory that can be used for this purpose.

The machine controller is therefore realized as a PLC, PC or microcontroller.

It is possible for the control program to be stored in the data format used by the drive system, e.g., as a binary file, so that it can be transferred directly to the memory of the drive system without first having to undergo time-consuming conversion steps.

For differentiation purposes, the various control programs can be provided with a version identification element readable by the machine controller. This makes it easy to differentiate the various versions of control programs and identify which program is needed or desired for the current machine. The machine controller can then compare the version identification element read from the newly installed drive against that stored in its memory and determine whether the stored program needs to be replaced or should be replaced or is desired to be replaced. Should this be the case, the machine controller transfers the stored control program to the drive system and overwrites the program already in memory, for example, so that the memory thereafter comprises the appropriate program.

The version identification element could be a software identifier, which allows the higher-level machine controller to recognize the control program on the drive system. For example, each handling machine uses a control program, which differs from any other control program used for a different handling machine. To explain further, the control program used for a filling machine differs from the control program used for a closing machine. These control programs then differ from the control program used for a labeling machine. Each control program comprises a version identification element or software identifier, which differs from any other version identification element or software identifier used in a different handling machine. To explain further, the version identification element or software identifier used in a filling machine control program differs from the version identification element or software identifier used in a closing machine control program. These the version identification elements or software identifiers then differ from the version identification element or software identifier used in a labeling machine control program. The higher-level machine controller is configured to recognize these various version identification elements or software identifiers and differentiate them from one another.

This can be performed either automatically or manually, whereby it is possible for the check to be performed after the replacement of the drive system. Replacement, if necessary or desired, can likewise be performed automatically or following confirmation, e.g., by an operator.

These and other embodiments of the present application are disclosed according to the present application.

To achieve this object, the present application also proposes a device for the handling of bottles, cans and similar containers and/or the treatment of bottles, cans or similar containers having a machine controller and at least one drive system according to the present application. This device also achieves the stated object.

To achieve the object, the present application also provides a control process for drive systems and/or a process for controlling a drive system for use in devices or machines for the handling of bottles, cans or similar containers. The devices or machines have a higher-level machine controller and the drive system is designed to be replaceable and has at least one drive element, an electronic open and/or closed-loop control and/or monitoring unit and a memory for the storage of a control program for the electronic open and/or closed-loop and/or monitoring unit. The control program is transferred from the machine controller to the rewriteable memory of the drive system via corresponding communication interfaces on the drive system and the machine controller, which also achieves the object.

The drive element according to the present application can be used in labeling and/or printing machines in plants which utilize multiple lines for different sizes of bottles and for filling different types of liquid material. Since the labeling and/or printing machines are configured differently in each line, the interchangeable drive element according to the present application can be used to replace a faulty drive element in any of the plant's labeling and/or printing machines.

For example, if a drive element were to malfunction in a labeling and/or printing machine in a line which fills twenty-ounce bottles, an interchangeable drive element can be installed to replace the faulty element. The labeling and/or printing machine controller then transfers the control program to the drive element memory so the labeling and/or printing of twenty-ounce bottles can then resume. It is then also possible to take an interchangeable drive element from the labeling and/or printing machine from one line, which for example deals with twenty-ounce bottles, and install that interchangeable drive element to a labeling and/or printing machine from a second line, which for example deals with two-liter bottles.

The interchangeable drive element of the present application can additionally be used in a bottling plant which utilizes one line to bottle one liquid material with one type of bottle. The interchangeable drive could be preprogrammed with a control program that is most likely to be used in a handling machine. If the control program does not conform to the handling machine, the higher-level machine controller then rewrites the memory of the drive device with the control program from the memory of the machine controller.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is described in greater detail below with reference to the attached drawings, in which.

DESCRIPTION OF EMBODIMENT OR EMBODIMENTS

Figure 1:
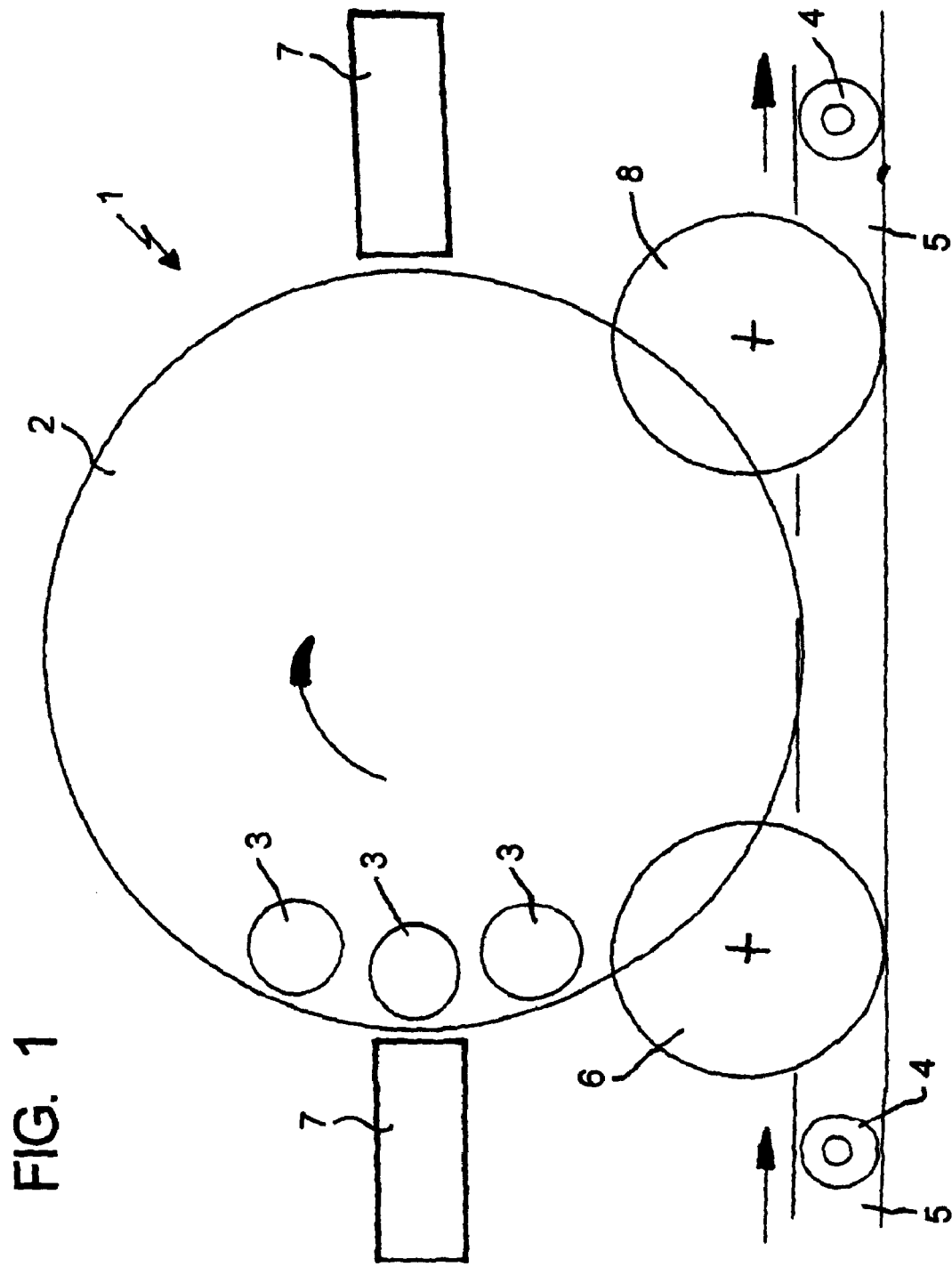
FIG. 1 shows a schematic plan view of a handling machine according to at least one possible embodiment according to the present application.

A handling machine according to at least one possible embodiment of the present application, designated as a whole with 1, is shown schematically in FIG. 1. It has a circular rotor 2, which is mounted so as to rotate round a vertical axis and is rotated by means of drive system not shown in greater detail. Mounted on the rotor are a plurality of container carriers 3, which rotate with the rotor and can be rotated around their center axis.

Containers 4, e.g. bottles, are delivered to the machine by means of a conveyor mechanism 5 and placed by means of a starwheel 6 on the container carriers 3, where the containers 4 are pressed against container carriers 3 from above by a fixing mechanism not shown in greater detail.

The rotating rotor 2 moves the containers past processing stations 7, which apply a label to the front and back of the container, for example. Rotation of the container carrier 3 essentially ensures or promotes the precise or virtually precise or general positioning of the label on the front and/or back side and a corresponding rotation of the container 4 as it passes by essentially ensures or promotes that the label is applied cleanly. Once the containers have been passed by all or virtually all or most of the processing stations, the fixing mechanism is released and the containers are removed from the container carriers 3 via a starwheel 8 and placed on the transport mechanism 5, from which they are subsequently removed.

Figure 1A:
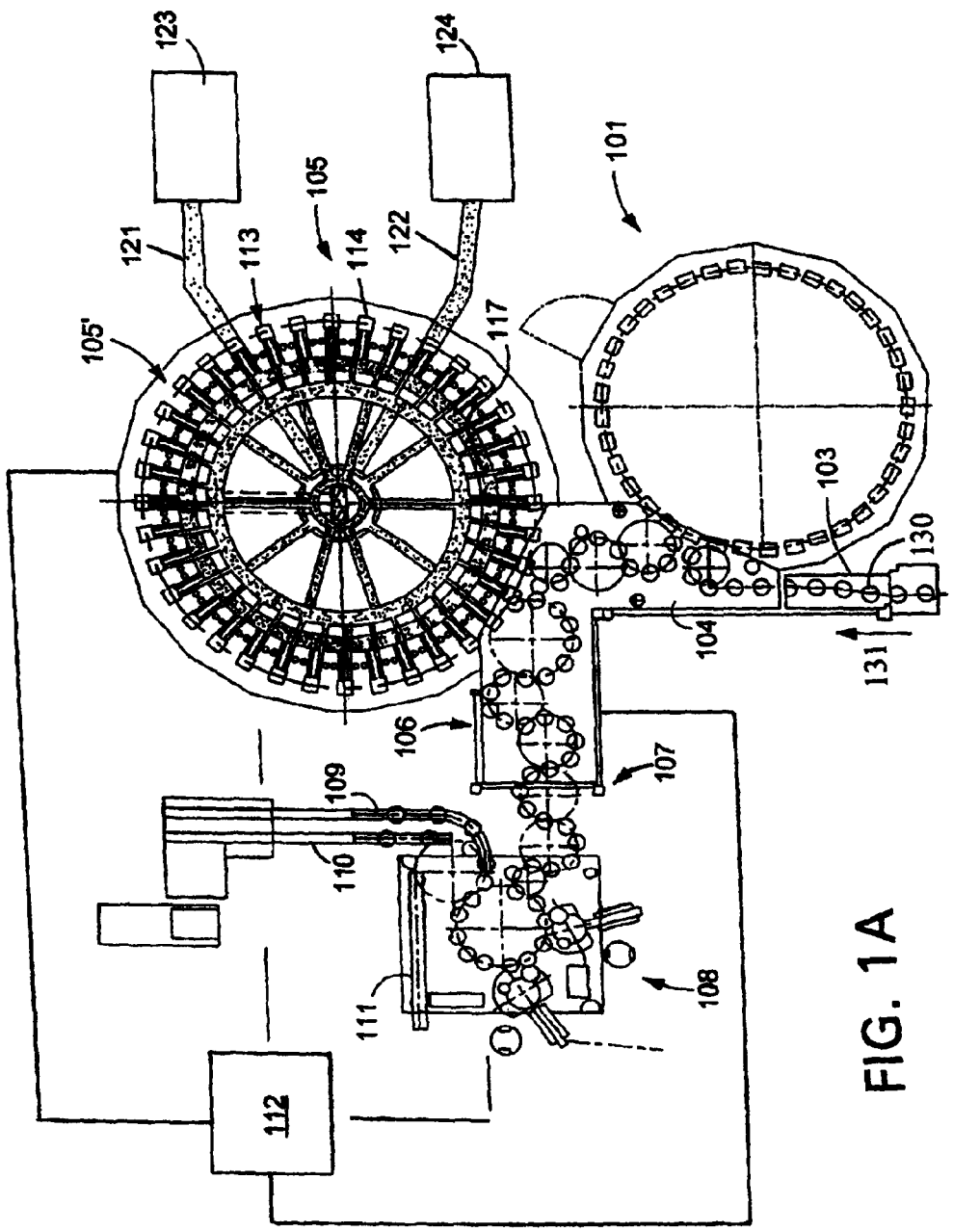
FIG. 1A shows schematically the main components of a system for filling containers with at least one liquid beverage, in accordance with at least one possible embodiment, in which system or plant could possibly be utilized at least one aspect, or several aspects, of the embodiments disclosed herein.

FIG. 1A shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

In one possible embodiment in accordance with the present application, the handling machine 1 can be included in at least one of the rinsing station 101, the beverage filling machine 105, the beverage bottle closing arrangement or closing station 106, and the beverage bottle labeling arrangement or labeling station 108.

Figure 2:
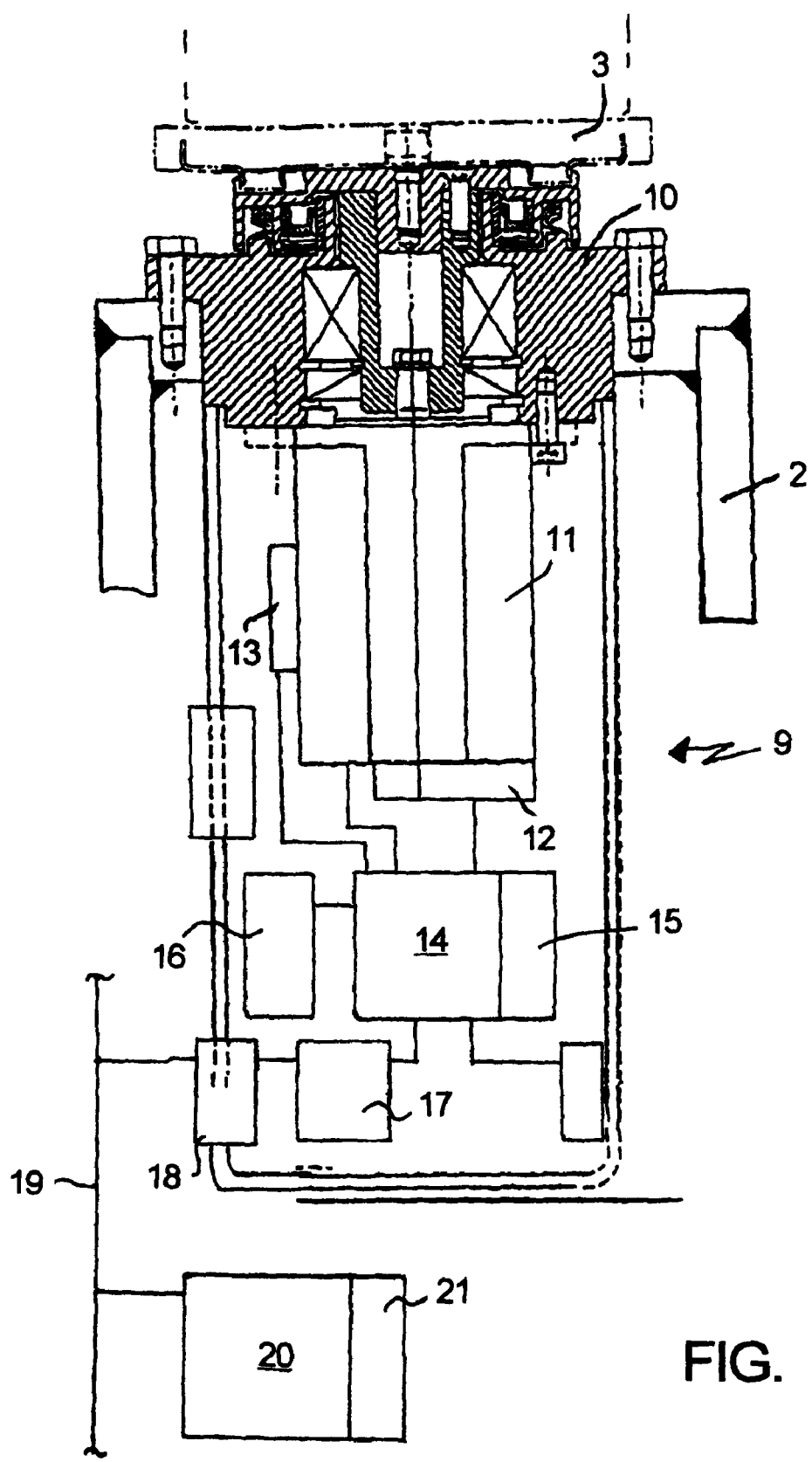
FIG. 2 shows a partial sectional schematic of a drive system according to the present application.

A drive system, designated as a whole with 9 and shown in greater detail in FIG. 2, is provided for the precise or virtually precise or general positioning of the container carriers 3. The cover plate 10 of the drive system 9, which is configured as a compact module, is inserted into and fastened in corresponding recesses in the rotor 2. A container carrier 3 is mounted to the top of each drive system.

Inside is an electric motor-driven servo drive 11 for the precise or virtually precise or general rotation of the container carrier 3, the axis of rotation of said servo drive is either connected directly, or in one embodiment, via a gearbox to the axis of rotation of the container carrier 3.

To determine the current angular position of the servo drive 11 and thus the container carrier 3, an angular rotation sensor 12 is provided at the servo drive 11. Another sensor 13 is provided for the monitoring of additional operating parameters and for fault detection.

The sensors 12 and 13 are connected to a control unit 14. This has internal memory 15 for recording current operating parameters and separate memory 16 for the storage of a control program.

The control unit 14 is connected to an external bus system 19 via a communication interface 17 and a plug connection 18.

Besides the drive system 9 according to at least one embodiment of the present application, the bus system 19 is also connected to a higher-level machine controller 20. This monitors the function of the machine 1 using a number of sensors not shown in greater detail and routes the control commands to the various machine components. Among other things, it forwards to the drive system 9 the appropriate control commands to position a container carrier 3 as currently required or desired.

These control commands, which are transmitted via the bus system 19 and the communication interface 17 to the controller 14, are analyzed there, and control pulses for the required or desired rotation of the servomotor 11 are generated on the basis of the current position of the container carrier 3 as indicated by the sensor 12, and are sent to the servomotor 11. Feedback on the current position of the container carrier 3 can also be sent from the controller 14 to the machine controller 20 in the same manner.

The machine controller 20 also has a memory area 21 in which the control programs required or desired for the individual components of the machine are stored. Furthermore, the machine controller 20 can, via the bus system 19, query the individual controllers 14 for the version identification element or software identifier of the control programs stored in the drive system memories 16. The machine controller 20 can also compare these identification elements with the identification elements of the control programs stored in the higher-level machine controller memory 21. It is also possible to transfer the control programs stored in the memory 21 to selected control units 14 via the communication interface 17 and overwrite the control programs stored in the memory 16.

In the event of a defect in any part of a drive system 9, the defect is recognized by the control unit 14 and communicated to the machine controller 20 via the communication link 17. Independent of the severity of the defect, this annunciates an alarm and brings the machine to a standstill. It also displays corresponding messages and identifies the relevant drive system.

This drive system 9 can then be replaced by a functional one by removing the complete unit from the rotor 2 and inserting and fastening the new, functional unit. All or virtually all that remains is to restore the electrical and communication connections, and the machine is essentially ready for service.

Following installation, the machine controller 20 queries the version identification element or software identifier of the control program stored in the memory 16 of the newly installed control unit 14 and compares this identification element with that of control program stored in its memory 21 and is required or desired for the correct function of the machine. If the two identification elements match, corresponding messages are generated and the machine 1 can be returned to service.

If the version identification elements or software identifiers do not match, the machine controller 20 transfers a copy of the appropriate control program stored in its memory 21 to the control unit 14 via the bus system 19 and the communication link 17, and the controller overwrites the control program currently in its memory 16. Upon conclusion of the transfer process and possibly a check of whether the transfer was successful, the correct control program is now present in the replacement drive system 9, so that a restart of the machine 1 can be initiated subsequently by the machine controller as described above.

The drive system 9 is configured to be installed in a handling machine 1, which handling machine 1 could be interchangeably used in a variety of stations in a container-filling plant, for example a beverage bottling-filling plant. In accordance with at least one possible embodiment of the present application, the drive system 9 can be interchangeably installed in a rinsing station 101, a beverage filling machine 105, a beverage bottle closing arrangement or closing station 106, and a beverage bottle labeling arrangement or labeling station 108, among other handling machines 1 for beverage bottles, or other such containers. The drive system 9 comprises, among other things, a version identification element. The version identification element could also be a software identifier, which the higher-level machine controller reads in order to recognize the control program loaded onto the drive system 9.

In at least one possible embodiment, the handling machine 1 comprises a higher-level machine controller 20. The higher-level machine controller 20 monitors the function of the machine 1 and routes the control commands to the various machine components. The higher-level machine controller 20 comprises a memory 21.

When a drive system 9 is placed into a handling machine 1, for example a filling machine 105, the higher-level machine controller 20 queries the drive system 9 for the version identification element or software identifier. The higher-level machine controller 20 then recognizes if a control program is written on the drive system 9, and if so, which control program is on the drive system 9 and for which handling machine 1 the control program on the drive system 9 was used. If there is no control program stored in the memory 16 of the drive system 9, the machine controller 20 transfers a control program stored in the memory 21 to the memory 16 of the drive system 9 associated with the machine in which the drive system 9 is installed. If there is a control program stored in the memory 16 of the drive system 9, the higher-level machine controller 20 compares the version identification element or software identifier of the program stored in the memory 16 with the control programs stored in the memory 21. If the version identification element or software identifier of the control program on the drive system 9 differs from that of the memory area 21 of the higher-level machine controller 20, the higher-level machine controller 20 overwrites the control program previously stored in the memory 16 with a new control program from the memory 21 of the machine controller 20 via the communication link 17.

In other words and in accordance with at least one possible embodiment of the present application, a functional drive system 9 can be taken from one handling machine 1 to another, separate handling machine 1 and still be compatible and functional. For example, a drive system 9, which had been used in a filling machine 105, can be removed and later installed into a closing arrangement or closing station 106. The higher-level machine controller 20 queries the memory 16 of the drive system 9 and reads the previously installed control program. The version identification element or software identifier compares the previously installed control program in the memory 16 with a memory 21 of the higher-level machine controller 20. Since the program in the memory 16 would differ from the program in the memory 21 of the machine controller 20 of the closing arrangement 106, the machine controller 20 overwrites the previously stored control program on the memory 16 of the drive system 9 with a new program from the memory 21. The electrical and communication connections are restored between the drive system 9 and the closing arrangement 106, and the drive system 9 installed in the closing arrangement 106 is essentially ready for service.

In at least one possible embodiment according to the present application, each handling machine 1, for example a rinsing station 101, a beverage filling machine 105, a beverage bottle closing arrangement or closing station 106, and a beverage bottle labeling arrangement or labeling station 108, among others, each comprise a higher-level machine controller 20.

In another possible embodiment, the higher-level machine controller 20 is configured to control the plant and all of the plant's handling machines 1, for example a rinsing station 101, a beverage filling machine 105, a beverage bottle closing arrangement or closing station 106, in a beverage bottle labeling arrangement or labeling station 108, among others. In this one embodiment, the higher-level machine controller 20 comprises a memory area 21 for each handling machine 1. In other words, in this possible embodiment, the higher-level machine controller 20 comprises a rinsing station memory area 21, a beverage filling machine memory area 21, a beverage bottle closing arrangement or closing station memory area 21, a beverage bottle labeling arrangement or labeling station memory area 21, and including any other memory areas 21 which are desired for any additional handling machines 1 for use in the beverage bottling plant.

In yet another possible embodiment according to the possible embodiment, each handling machine 1 comprises a higher-level machine controller 20. Each higher-level machine controller 20 is further connected to a control device, which acts a mother unit to control each handling machine 1.

In another possible embodiment according to the present application, the drive system 9 comprises several memories 16. A control program is written to each memory 16. For example and according to one possible embodiment according to the present application, a drive system 9 comprises four separate memories 16. A control program for rinsing machines 101 is written to the first memory 16 of the drive system 9. A control program for filling machines 105 is written to the second memory 16 of the drive system 9. A control program for closing arrangement or closing station 26 is written to the third memory 16 of the drive system 9. A control program for labeling arrangement or labeling station 108 is written to the fourth memory 16 of the drive system 9. When the drive system 9 is installed in a rinsing machine 101, the higher-level machine controller 20 activates the first memory 16 with the rinsing machine control program. If this same drive system 9 is removed from the rinsing machine 101, and later installed into a filling machine 105, the higher-level machine controller 20 activates the second memory 16 with the filling machine control program.

The above description of one possible embodiment referred to control software. Within the context of this application, the term "control software" is understood to be any software required or desired for the operation of the drive systems, whereby it is not mandatory or may not be mandatory or desired within the context of the present application that this software be transferred in its entirety to the memory 16 of the drive system by the machine controller 20. For example, portions of the required or desired software can already be present within the drive system.

Within the context of this application, the term "control software" is understood to refer to software components generally known as an operating system as well as software components generally know as application software.

"Operating system" refers to programs or data that provide the higher-level software, for example the controller software, with the information and control commands necessary or desired to operate the components (hardware components) within the drive system. "Application software" refers in the embodiment shown here to such things as the rotation program, i.e. the instruction for how the containers are to be turned during a rotation of the rotor.

The present application is not restricted to the one possible embodiment above and can be modified in numerous ways without straying from the basic principle.

For example, use of the drive system is by no means restricted to driving disk-shaped container carriers. Rather a number of drive systems used in handling machines can be designed as modular units and adapted to the respective application through the use of appropriately modified control programs. The present application can, of course, also be used with such systems.

Other derivations of the present application, such as the use of external memory instead of integrated memory, star configuration communication systems instead of the use of a bus system, a plurality of possible drives are listed here by way of example of accessible derivations.

A drive system 9 for use in devices or machines 1 for the handling of bottles, cans and similar containers, whereby the devices or machines 1 have a higher-level machine controller 20 and the drive system 9 is designed to be replaceable and has at least one drive element, an electronic open and/or closed-loop control and/or monitoring unit 14 and a memory 16 for the storage of a control program for the electronic open and/or closed-loop and/or monitoring unit 14 should be useable without manual modification in a plurality of different machines.

To achieve this, there are corresponding communication interfaces 17 on the drive system 9 and the machine controller 20, and the memory 16 is rewriteable and configured such that the control program can be transferred from the machine controller 20 to the memory 16 via the communication interfaces 17.

One feature or aspect of an embodiment is believed at the time if the filing of this patent application to possibly reside broadly in a drive system 9 for use in devices or machines 1 for the handling of bottles, cans and similar containers, whereby the devices or machines have a higher-level machine controller 20 and the drive system 9 is designed to be replaceable and has at least one drive element, an electronic open-loop and/or closed-loop control and/or monitoring unit 14 and a memory 16 for the storage of a control program for the electronic open-loop and/or closed-loop and/or monitoring unit 14, wherein there are corresponding communication interfaces 17 on the drive system 9 and the machine controller 20 and the memory 16 is rewriteable and configured in such a way that the control program can be transferred from the machine controller 20 to the memory 16 via the communication interfaces 17.

Another feature or aspect of an embodiment is believed at the time if the filing of this patent application to possibly reside broadly in the drive system, wherein the machine controller 20 is configured for the storage of at least one control program for the electronic open-loop and/or closed-loop control and/or monitoring unit 14 of the drive system 9.

Yet another feature or aspect of an embodiment is believed at the time if the filing of this patent application to possibly reside broadly in the drive system, wherein the control program in the machine controller 20 is stored in a data format suitable for the electronic open-loop and/or closed-loop control and/or monitoring unit of the drive system 14.

Still another feature or aspect of an embodiment is believed at the time if the filing of this patent application to possibly reside broadly in the drive system, wherein each control program has a version identification element or software identifier and the machine controller 20 is configured to read the identification element or software identifier of the control program stored in the memory 16 of the drive system 9.

A further feature or aspect of an embodiment is believed at the time if the filing of this patent application to possibly reside broadly in the drive system, wherein the machine controller 20 is configured to compare the identification element read out with the identification element of the control program stored in the machine controller 20.

Another feature or aspect of an embodiment is believed at the time if the filing of this patent application to possibly reside broadly in the drive system, wherein in the event that the read out identification element of the control program stored in the memory of the drive system 9 does not match the identification element of the control program stored in the machine controller, the machine controller 20 transfers the control program stored in the machine controller 20 to the memory 16 of the drive system 9 via the communication interfaces 17.

Yet another feature or aspect of an embodiment is believed at the time if the filing of this patent application to possibly reside broadly in the drive system, wherein the machine controller 20 is configured in such a way that the reading out of the identification element of the control program stored in the memory 16 of the drive system 9 and the comparison with the identification element of the control program stored in the machine controller 20 and/or the transfer of the control program stored in the machine controller 20 to the memory 16 of the drive system 9 occurs following a replacement of the drive system 9 and/or automatically and/or in response to a trigger signal.

Still another feature or aspect of an embodiment is believed at the time if the filing of this patent application to possibly reside broadly in the drive system, wherein the machine controller 20 is configured in such a way that the transfer of the control program stored in the machine controller 20 to the memory 16 of the drive system 9 occurs automatically and/or in response to a confirmation signal.

One further feature or aspect of an embodiment is believed at the time if the filing of this patent application to possibly reside broadly in a device 1 for the treatment of bottles, cans or similar containers having a machine controller 20 and at least one drive system 9 according to the present application.

One feature or aspect of an embodiment is believed at the time if the filing of this patent application to possibly reside broadly in a process for controlling a drive system 9 for use in devices or machines 1 for the handling of bottles, cans or similar containers, whereby the devices or machines 1 have a higher-level machine controller 20 and the drive system 9 is designed to be replaceable and has at least one drive element, an electronic open and/or closed-loop control and/or monitoring unit 14 and a memory 16 for the storage of a control program for the electronic open and/or closed-loop and/or monitoring unit 14, wherein the control program is transferred from the machine controller 20 to the rewriteable memory 16 of the drive system via corresponding communication interfaces 17 on the drive system 9 and the machine controller 20.

Another feature or aspect of an embodiment is believed at the time if the filing of this patent application to possibly reside broadly in the process, wherein the transfer of the control program takes place one time prior to placing the drive system 9 into service.

Yet another feature or aspect of an embodiment is believed at the time if the filing of this patent application to possibly reside broadly in the process, wherein the machine controller 20 reads the version identification element or software identifier comprised in the control program out of the memory 16 of the drive system 9 and compares it with the version identification element or software identifier of a control program stored in the machine controller 20, and in the event that the version identification element or software identifier read out and that stored in the machine controller 20 are different, the control program stored in the machine controller 20 is transferred to the memory 16 of the drive system 9 via the communication interfaces 17.

The components disclosed in the various publications, disclosed or incorporated by reference herein, may possibly be used in possible embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

All of the patents, patent applications or patent publications, which were cited in the International Search Report dated Nov. 6, 2007, and/or cited elsewhere are hereby incorporated by reference as if set forth in their entirety herein as follows: DE 103 53 052, having the following English translation of the German title "AUTOMATION SYSTEM WITH INTERCOMMUNICATING COMPONENTS," published on Jun. 16, 2005; EP 1,174,345, having the following English translation of the German title "MACHINE FOR ORIENTING BOTTLES, CANS OR SIMILAR CONTAINERS," published on Jan. 23, 2002; EP 1,001,322, having the following English translation of the German title "PREPARATION UNIT FOR THE MEDICAL FIELD AND PROCESS FOR CONTROLLING SAME," published on May 17, 2000; and DE 103 58 270, having the following emission/and of the German title "PROCESS AUTOMATION SYSTEM CONTROL USES FIELD BUS SYSTEM WITH CONNECTION TO INTERNET SERVER FOR DEVICE MANAGEMENT," published on Aug. 4, 2005.

All of the patents, patent applications or patent publications, which were cited in the German Office Action dated May 29, 2007, and/or cited elsewhere are hereby incorporated by reference as if set forth in their entirety herein as follows: DE 100 34 907, having the following English translation of the German title "machine for orienting bottles, cans or similar containers," published on Jan. 31, 2002; DE 103 42 591, having the following English translation of the German title "automation object and method for writing information into an automation object," published on Apr. 14, 2005; DE 198 50 469, having the following English translation of the German title "automation system to access functionality of hardware components with each hardware component having system connection unit with function objects representing real functionality of the components," published on Nov. 2, 1998; DE 203 14 410, having the following English translation "automated industrial manufacturing plant has networked manufacturing units with an electronic reader and exchangeable memory element in which a unit address can be stored to enable fast identification to a configuration server," published on Sep. 30, 2004; and DE 103 53 052, having the following English translation of the German title "AUTOMATION SYSTEM WITH INTERCOMMUNICATING COMPONENTS," published on Jun. 16, 2005.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 028 797.5, filed on Jun. 23, 2006, having inventors Klaus KRÄMER and Winfried SCHLÜTER, and DE-OS 10 2006 028 797.5 and DE-PS 10 2006 028 797.5, and International Application No. PCT/EP2007/005401, filed on Jun. 20, 2007, having WIPO Publication No. WO2007/147567 and inventors Klaus KRÄMER and Winfried SCHLÜTER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/005401 and German Patent Application 10 2006 028 797.5 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/005401 and DE 10 2006 028 797.5 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Handling machine
2 Rotor
3 Container carrier
4 Container
5 Conveyor mechanism
6 Starwheel
7 Processing station
8 Starwheel
9 Drive system
10 Cover plate
11 Servo drive
12 Angular rotation sensor
13 Sensor
14 Control unit
15 Memory
16 Memory
17 Communication interface
18 Plug connection
19 Bus system
20 Machine controller
21 Memory

What is claimed is:

1. An interchangeable, electro-mechanical drive unit configured to handle bottles, cans or similar containers, said drive unit comprising:
   a mechanical drive element;
   an electronic open-loop and/or closed-loop control and/or monitoring device;
   a rewriteable memory being configured to store a control program for said device;
   a communications interface being configured to operatively connect said drive unit with a machine control system external to said drive unit;
   said memory is configured to receive a control program via said communications interface from a machine control system;
   a sensor being operatively connected to said device, and being configured to detect malfunctions of said drive unit; and
   said device being configured to recognize malfunction information from said sensor and transmit the malfunction information via said communications interface to a machine control system to permit analysis of the malfunction information to determine if replacement of said drive unit with another drive unit is required.

2. The drive unit according to claim 1, in combination with a machine control system external to said drive unit, wherein said machine control system is configured to detect, upon replacement of said drive unit with a second drive unit, a control program stored in said memory of said second drive unit, and then compare said second drive unit control program with a system control program stored in a memory of said control system, which system control program determines the operation of said drive units.

3. The combination according to claim 2, wherein:
   said machine control system is configured to store said system control program in a data format suitable for said device; and
   said machine control system is configured to transfer said system control program to said memory of said second drive unit upon said machine control system determining that said second drive unit control program does not match said system control program.

4. The combination according to claim 3, wherein said machine control system is configured to detect and compare said second drive unit control program with said system control program, and/or transfer said system control program to said memory of said second drive unit at least one of: following a replacement of said drive unit with said second drive unit, automatically, and in response to a confirmation signal.

5. The combination according to claim 4, wherein said machine control system is configured to transfer said system control program to said memory of said second drive unit at least one of: automatically and in response to a confirmation signal.

6. The combination according to claim 5, wherein said machine control system is configured to transfer said system control program to said memory of said drive unit prior to use of said drive unit in handling bottles, cans or similar containers.

7. The drive unit according to claim 1, wherein said drive unit comprises a modular drive unit configured to be detachably connected to a container handling machine.

8. The drive unit according to claim 7, wherein said drive unit comprises a container carrier configured to carry a bottle, can or similar container.

9. The drive unit according to claim 8, in combination with a rotary container labeling machine, wherein:
   said rotary container labeling machine comprises a rotor configured to have a plurality of modular drive units detachably connected thereto; and
   said mechanical drive element is operatively connected to said container carrier to rotate said container carrier at least one of: prior to and during labeling of a container carried thereon.

10. The drive unit according to claim 9, in further combination with a machine control system external to said drive unit, wherein:
    said machine control system is configured to detect, upon replacement of said drive unit with a second drive unit, a control program stored in said memory of said second drive unit, and then compare said second drive unit control program with a system control program stored in a memory of said control system, which system control program determines the operation of said drive units;
    said machine control system is configured to store said system control program in a data format suitable for said device;
    said machine control system is configured to transfer said system control program to said memory of said second drive unit upon said machine control system determining that said second drive unit control program does not match said system control program;
    said machine control system is configured to detect and compare said second drive unit control program with said system control program at least one of: following a replacement of said drive unit with said second drive unit, automatically, and in response to a confirmation signal;
    said machine control system is configured to transfer said system control program to said memory of said second drive unit at least one of: automatically and in response to a confirmation signal; and
    said machine control system is configured to transfer said system control program to said memory of said drive unit prior to use of said drive unit in handling bottles, cans or similar containers.

11. A method of controlling an interchangeable, electromechanical drive unit configured to handle bottles, cans or similar containers, said drive unit comprising:
- a mechanical drive element;
- an electronic open-loop and/or closed-loop control and/or monitoring device;
- a rewriteable memory being configured to store a control program for said device;
- a communications interface being configured to operatively connect said drive unit with a machine control system external to said drive unit;
- said memory is configured to receive a control program via said communications interface from a machine control system; and
- a sensor being operatively connected to said device; and
said method comprising the steps of:
- detecting malfunctions of said drive unit with said sensor;
- recognizing malfunction information from said sensor with said device; and
- transmitting the malfunction information via said communications interface to a machine control system to permit analysis of the malfunction information to determine if replacement of said drive unit with another drive unit is required.

12. The method according to claim 11, wherein said drive unit is in combination with a machine control system external to said drive unit, and said method further comprises:
- determining said drive unit is malfunctioning sufficiently to require replacement, and then replacing said drive unit with a second drive unit;
- detecting with said machine control system a control program stored in said memory of said second drive unit; and
- comparing with said machine control system said second drive unit control program with a system control program stored in a memory of said control system, which system control program determines the operation of said drive units.

13. The method according to claim 12, wherein said method further comprises:
- storing said system control program in a data format suitable for said device; and
- transferring with said machine control system said system control program to said memory of said second drive unit upon said machine control system determining that said second drive unit control program does not match said system control program.

14. The method according to claim 13, wherein said steps of detecting, comparing, and/or transferring are performed at least one of: following a replacement of said drive unit with said second drive unit, automatically, and in response to a confirmation signal.

15. The method according to claim 14, wherein said step of transferring is performed at least one of: automatically and in response to a confirmation signal.

16. The method according to claim 15, wherein said method further comprises transferring with said machine control system said system control program to said memory of said drive unit prior to use of said drive unit in handling bottles, cans or similar containers.

17. The method according to claim 11, wherein said drive unit comprises a modular drive unit configured to be detachably connected to a container handling machine.

18. The method according to claim 17, wherein said drive unit comprises a container carrier configured to carry a bottle, can or similar container, and said method further comprises carrying a bottle, can or similar container with said container carrier.

19. The method according to claim 18, wherein said drive unit is in combination with a rotary container labeling machine, wherein said rotary container labeling machine comprises a rotor configured to have a plurality of modular drive units detachably connected thereto; and said mechanical drive element is operatively connected to said container carrier to rotate said container carrier at least one of: prior to and during labeling of a container carried thereon; and wherein said method further comprises the steps of:
- activating said mechanical drive element and rotating said container carrier at least one of: prior to and during labeling of a container, and labeling the container.

20. The method according to claim 19, wherein said drive unit is in further combination with a machine control system external to said drive unit, method further comprises:
- determining said drive unit is malfunctioning sufficiently to require replacement, and then replacing said drive unit with a second drive unit;
- detecting with said machine control system a control program stored in said memory of said second drive unit;
- comparing with said machine control system said second drive unit control program with a system control program stored in a memory of said control system, which system control program determines the operation of said drive units;
- storing said system control program in a data format suitable for said device;
- transferring with said machine control system said system control program to said memory of said second drive unit upon said machine control system determining that said second drive unit control program does not match said system control program;
- transferring with said machine control system said system control program to said memory of said drive unit prior to use of said drive unit in handling bottles, cans or similar containers;
- said steps of detecting and comparing are performed at least one of: following a replacement of said drive unit with said second drive unit, automatically, and in response to a confirmation signal; and
- said step of transferring is performed at least one of: automatically and in response to a confirmation signal.

* * * * *